(12) United States Patent
George

(10) Patent No.: US 12,595,031 B1
(45) Date of Patent: Apr. 7, 2026

(54) WAKE VISION SYSTEM AND METHOD

(71) Applicant: Brunswick Corporation, Mettawa, IL (US)

(72) Inventor: Trevor George, Savoy, IL (US)

(73) Assignee: Brunswick Corporation, Mettawa, IL (US)

( * ) Notice: Subject to any disclaimer, the term of this patent is extended or adjusted under 35 U.S.C. 154(b) by 266 days.

(21) Appl. No.: 17/673,250

(22) Filed: Feb. 16, 2022

(51) Int. Cl.
| | |
|---|---|
| *B63B 79/15* | (2020.01) |
| *B63B 49/00* | (2006.01) |
| *B63H 21/21* | (2006.01) |
| *G05D 1/00* | (2024.01) |

(52) U.S. Cl.
CPC .............. *B63B 79/15* (2020.01); *B63B 49/00* (2013.01); *B63H 21/21* (2013.01); *G05D 1/0206* (2013.01)

(58) Field of Classification Search
CPC ......... B63B 79/15; B63B 49/00; B63H 21/21; G05D 1/0206
USPC .......................................................... 701/21
See application file for complete search history.

(56) References Cited

U.S. PATENT DOCUMENTS

| | | | | |
|---|---|---|---|---|
| 6,171,021 | B1 | 1/2001 | Feldtmann | |
| 7,031,224 | B2 | 4/2006 | Reifer | |
| 7,082,355 | B1 * | 7/2006 | Jacobson | ................ B63B 49/00 |
| | | | | 340/985 |
| 7,335,071 | B1 * | 2/2008 | Motsenbocker | ....... B63H 23/30 |
| | | | | 440/71 |

| | | | | |
|---|---|---|---|---|
| 7,780,490 | B2 | 8/2010 | Lundgren | |
| 8,305,257 | B2 | 11/2012 | Trizna | |
| 8,423,487 | B1 | 4/2013 | Rubin | |
| 8,494,697 | B2 | 7/2013 | Ballou et al. | |
| 8,989,948 | B2 * | 3/2015 | Huntsberger | .......... G01C 11/04 |
| | | | | 701/28 |
| 9,207,675 | B1 | 12/2015 | Walser et al. | |
| 9,873,491 | B2 | 1/2018 | Hartman | |
| 9,996,083 | B2 | 6/2018 | Vojak | |
| 10,259,544 | B2 | 4/2019 | Venables et al. | |
| 10,372,976 | B2 | 8/2019 | Kollman et al. | |
| 10,507,895 | B2 | 12/2019 | Grace et al. | |
| 10,677,891 | B2 | 6/2020 | Rudzinsky et al. | |
| 10,780,968 | B2 | 9/2020 | Kusters, Jr. et al. | |
| 10,936,907 | B2 | 3/2021 | Suresh et al. | |
| 11,029,686 | B2 | 6/2021 | Tyers | |
| 11,046,393 | B2 | 6/2021 | Sheedy et al. | |

(Continued)

FOREIGN PATENT DOCUMENTS

GB 2063003 B 5/1984

*Primary Examiner* — Helal A Algahaim
*Assistant Examiner* — Ashleigh Nicole Turnbaugh
(74) *Attorney, Agent, or Firm* — Andrus Intellectual Property Law, LLP

(57) ABSTRACT

A wake detection system for a marine vessel comprises a stereovision system and a control system. The stereovision system includes at least two cameras and is configured to image a water surface behind the marine vessel. The control system is configured to receive image data from the stereovision system, including at least one image of the water surface behind the marine vessel, identify at least one wave on the water surface in the at least one image, then determine at least one dimension of the at least one wave. The control system is further configured to then determine whether the at least one dimension of the at least one wave is exceeds a pre-wake threshold, and then generate a wake mitigation action.

24 Claims, 7 Drawing Sheets

(56)  References Cited

U.S. PATENT DOCUMENTS

| | | | |
|---|---|---|---|
| 11,067,979 B2 | 7/2021 | Green et al. | |
| 2013/0110329 A1* | 5/2013 | Kinoshita ............ | G05D 1/0206 |
| | | | 367/107 |
| 2020/0012283 A1* | 1/2020 | Nguyen ................ | G05D 1/0206 |
| 2020/0125821 A1* | 4/2020 | Choiniere ............. | B64C 39/024 |
| 2020/0275036 A1* | 8/2020 | Kurokawa ............ | H04N 7/181 |
| 2021/0078682 A1 | 3/2021 | Schmidt et al. | |
| 2022/0276047 A1* | 9/2022 | Colgan ................ | G01C 13/004 |

* cited by examiner

1

WAKE VISION SYSTEM AND METHOD

FIELD

The present disclosure generally relates to vision systems for marine vessels and methods for implementing visions systems on marine vessels, and more specifically, to vision systems configured to analyze environments surrounding a marine vessel.

BACKGROUND

Marine vessels traveling through bodies of water produce disturbances in the water's surface downstream of the direction of travel, known as a wake. Certain sections of water are regulated by 'no wake zones' which are intended to help reduce wave production that could be a source of disturbance or danger for other boaters, local environments, swimmers, etc. A wake wave is different and potentially more hazardous than a regular wave because of its speed of travel, amplitude, and frequency of wave peaks. For this reason, it is important to adhere carefully to regulated zones and regulations related to wake. A wake can be measured and analyzed by its quantitative and/or qualitative features, such as amplitude, distance from crest to crest, frequency, persistence, wave geometry, and the presence/absence of whitewater caps. Many factors can affect wake production by a vessel, including hull size, vessel weight, direction of travel relative to naturally produced waves, current, wind, and more.

Stereovision systems use a configuration of multiple cameras to capture image data and derive distances based on differences in pixel location. Utilizing this technology, stereovision systems can produce depth disparity maps that can identify the presence and/or characteristics of wave events such as wake traveling downstream from a marine vessel. Further technologies, such as computer vision learning systems and/or other stereo vision processing algorithms, can utilize stereovision image data to carry out functions such as identifying wave geometries or wake identifiers such as whitewater caps based upon previously stored data.

The following U.S. Patents and Applications provide background information and are incorporated herein by reference, in entirety.

U.S. Pat. No. 8,989,948 discloses systems and methods for sea state prediction and autonomous navigation. One embodiment includes a method of predicting a future sea state including generating a sequence of at least two 3D images of a sea surface using at least two image sensors, detecting peaks and troughs in the 3D images using a processor, identifying at least one wavefront in each 3D image based upon the detected peaks and troughs using the processor, characterizing at least one propagating wave based upon the propagation of wavefronts detected in the sequence of 3D images using the processor, and predicting a future sea state using at least one propagating wave characterizing the propagation of wavefronts in the sequence of 3D images using the processor. Another embodiment includes a method of autonomous vessel navigation based upon a predicted sea state and target location.

U.S. Pat. No. 10,372,976 discloses an object detection system for a marine vessel having at least one marine drive and at least one image sensor positioned on the marine vessel and configured to capture an image of a marine environment on or around the marine vessel, and a processor. The object detection system further includes an image scanning module executable on the processor that receives the image as input. The image scanning module includes an artificial neural network trained to detect patterns within the image of the marine environment associated with one or more predefined objects, and to output detection information regarding a presence or absence of the one or more predefined objects within the image of the marine environment.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a wake detection system for a marine vessel comprises a stereovision system and a control system. The stereovision system includes at least two cameras and is configured to image a water surface behind the marine vessel. The control system is configured to receive image data from the stereovision system, including at least one image of the water surface behind the marine vessel, identify at least one wave on the water surface in the at least one image, then determine at least one dimension of the at least one wave. The control system is further configured to then determine whether the at least one dimension of the at least one wave is exceeds a pre-wake threshold, and then generate a wake mitigation action.

In one example, the wake mitigation action includes an alert generated on a user interface.

In another example, the wake mitigation action includes controlling a propulsion system of the marine vessel to prevent a speed increase or reduce a speed of the marine vessel.

In another example, the control system is further configured to determine that the at least one wave is a vessel-generated wave prior to generating the wake mitigation action.

In another example, the control system is further configured to detect a wake behind the marine vessel based on the image data, and then generate a wake elimination action.

In another example, the control system is further configured to determine that the marine vessel is in a no wake zone prior to generating the wake mitigation action.

In one embodiment, a method of detecting wake behind a marine vessel includes imaging a water surface with an image system, receiving image data from the image system, the image data containing at least one image of the water surface behind the marine vessel, identifying at least one wave on the water surface in the at least one image, then determining at least one dimension of the at least one wave. Upon determining the at least one dimension, the method further includes determining that the at least one dimension is exceeds a pre-wake threshold and then generating a wake mitigation action.

In one example, the wake mitigation action includes an alert generated on a user interface.

In another example, generating the wake mitigation action includes controlling a propulsion system of the marine vessel to prevent a speed increase or reduce a speed of the marine vessel.

In another example, the method further includes detecting a wake behind the marine vessel based on the image data and then generating a wake elimination action.

In another example, the method further includes detecting a no wake indicator in the image data, identifying a no wake zone based on the no wake indicator, and determining that the marine vessel is in the no wake zone.

In one embodiment, a method of detecting a no wake zone includes receiving sensor data of an area surrounding a marine vessel, identifying a no wake zone based on the sensor data, determining that the marine vessel is in or approaching the no wake zone, and generating a wake elimination action.

In one example, the sensor data includes a GPS location of the marine vessel, and determining that the marine vessel is in or approaching the no wake zone includes determining that the GPS location the marine vessel is in or within a threshold distance of the no wake zone.

In another example, the method further comprises, upon determining that the marine vessel is in or approaching the no wake zone, receiving image data from a vision system imaging a water surface behind the marine vessel, identifying at least one wave on the water surface based on the image data, determining the at least one wave is a wake wave, and generating a wake elimination action.

Various other features, objects, and advantages of the invention will be made apparent from the following description taken together with the drawings.

BRIEF DESCRIPTION OF THE DRAWINGS

The present disclosure is described with reference to the following FIGS.

DETAILED DESCRIPTION

A day on the lake is meant to be enjoyable for everyone involved. The pressures of driving the boat, however, can often detract from the overall experience. The present inventors have recognized that available systems do not assist users in identifying and complying with the restrictions of no wake zones. In navigating through bodies of water having no wake zones, operators are at risk of going too fast and creating erosion damage and/or receiving a ticket. On the other hand, going too slow leaves fun boating time on the table, taking longer than required to traverse along a no wake zone.

Furthermore, definitions of wake vary according to local ordinances, environmental constraints of the body of water, times of day, and other factors. Thus, it is difficult for users to be aware of the myriad of variables governing their production of wake, thus causing stress and detracting from the enjoyment that should accompany a day on the water.

Inventors have developed a system that automatically detects when the vessel is in a no wake zone and/or monitors wave production by the marine vessel. The system uses imaging systems to identify if the marine vessel is nearly producing or already producing a wake and can be configured to take a mitigation action to reduce and/or prevent wake. Wake mitigation actions may include one or more of notifying the user that they are at risk of or actively producing a wake, providing speed reduction instructions to a user, or automatically adjusting the vessel's speed to eliminate wake. Stereovision systems may be utilized to image the water surface behind a marine vessel and may utilize depth disparity mapping to directly measure the geometry of the vessel-produced waves protruding from the stern of the boat in order to identify the existence of a wake. In some embodiments, computer vision machine learning may be employed to identify telltale signs of wake, such as certain wave geometries, wave patterns, and/or whitewater caps behind the marine vessel, and take action to eliminate said wake.

Additionally, the system may be configured in accordance with local Departments of Natural Resources or Coast Guards to adhere to local no wake enforcement such as hours of restriction, distance-to-shore guidelines, and local definitions and classifications of wake.

The wake zone and/or wake detection systems may be configured to be activated by a user, such as by activating a wake-detection mode of operation via a user interface. Alternatively or additionally, the system may be configured to automatically activate wake-detection mode upon identifying a no wake zone indicator. In an automatic configuration, sensor data is utilized to identify no wake zone indicators, such as imminent shorelines, warning buoys, or neighboring vessels. Another embodiment of the automatic configuration relies upon GPS data or other mapping systems to delineate areas classified as no wake zones.

Figure 1:
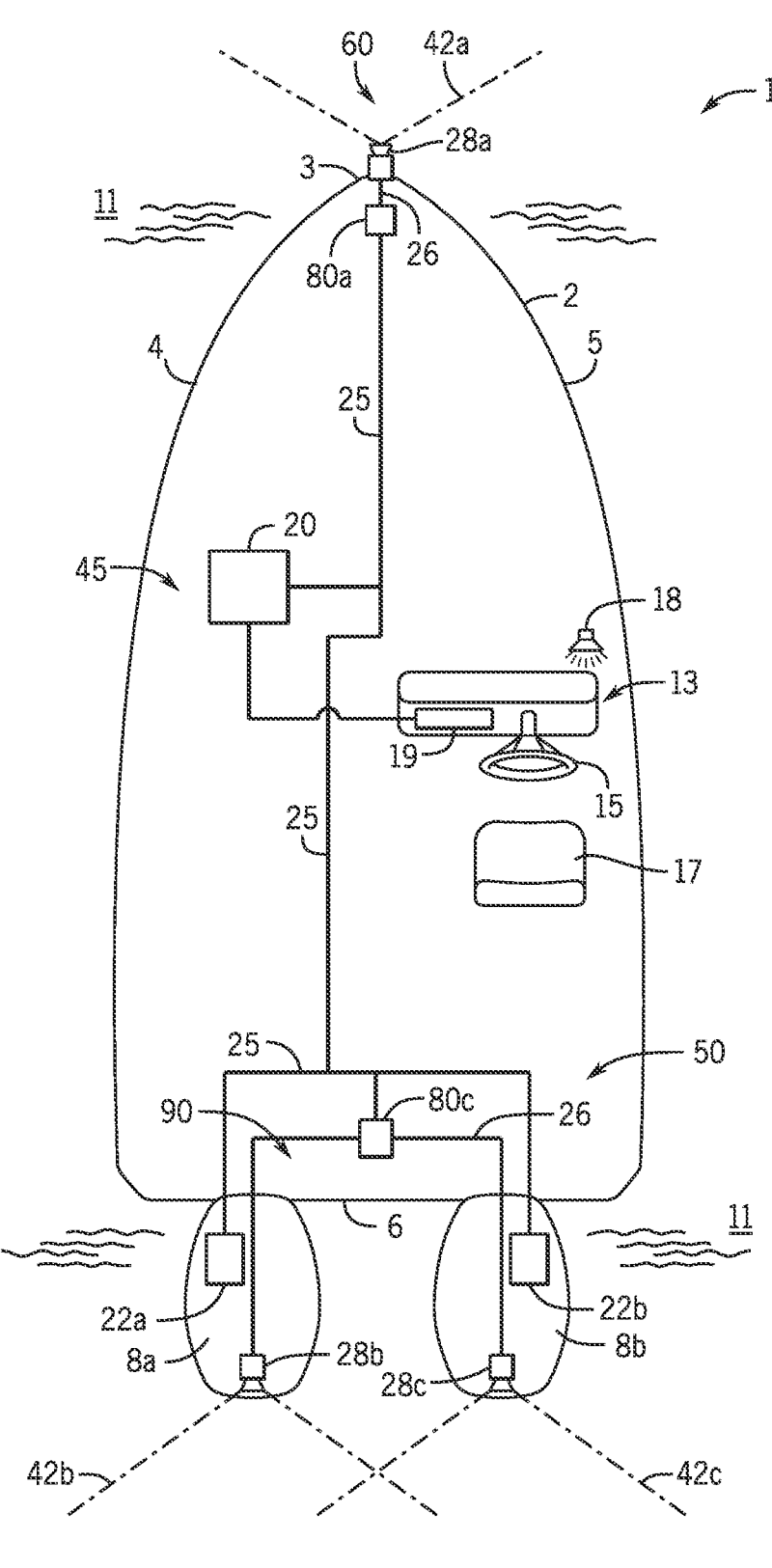
FIG. 1 is a schematic diagram representing one embodiment of a marine vessel having a wake detection system in accordance with one embodiment of the present disclosure.

FIG. 1 schematically depicts an exemplary embodiment of no wake zone vision system 1 on a marine vessel 2. The marine vessel 2 has a port side 4 and a starboard side 5, a bow 3 and a stern 6. The marine vessel 2 is equipped with two marine drives 8a and 8b at the stern 6, with marine drive 8a positioned toward the port side 4 and marine drive 8b toward the starboard side of the marine vessel 2. Each marine drive 8a and 8b is controlled by a respective powertrain computer 22a, 22b, as will be known to a person having ordinary skill in the relevant art. The powertrain computers 22a and 22b are in communication with a main processing unit 20 via CAN bus 25, which may control functions of devices at the helm 13 and process and coordinate communications to the powertrain computers 22a, 22b of the marine drives 8a, 8b. A control system 45 consists of the main processing unit 20, CAN bus 25, image bus 26, a propulsion system 90, and a stereovision system 50.

Stereovision system 50 uses a configuration of multiple image sensors 28b, 28c with corresponding image computers 80b, 80c to capture image data and derive distances based on differences in pixel location between images simultaneously captured by the image sensors 28b, 28c. The processed image data is communicated to the CAN bus via the image bus 26, which then communicates the data to the main processing unit 20.

Each marine drive 8a and 8b in combination with the coordinating powertrain computers 22a, 22b, user input devices, steering actuators, etc. constitute a propulsion system 90. The marine vessel 2 has a helm 13 having an input device 15, which is shown as a steering wheel but could also or alternatively include a joy stick, track pad, throttle lever, and/or any other user input device available in the art for providing throttle or steering input to control the marine vessel 2. A display 19 is also provided at the helm 13, which may be any digital or other display that provides a visual depiction of information relating to the marine vessel 2, such as vessel speed, engine status, fuel levels, direction, no wake zone notifications, etc. For example, the main processing unit 20 may track and/or control the multitude of subsystems on the marine vessel 2 and may control the display 19 to display information pertaining to the marine vessel 2 and/or its subsystems. To provide one example, the display 19 may be a Vessel View display by Mercury Marine Corporation of Fond du Lac, Wisconsin. Furthermore, a speaker 18 may also be provided at the helm 13 for providing audible output, such as to be audible by a person standing at the helm 13.

The concepts disclosed in the present disclosure are applicable to any type or size of marine vessel having any number of marine drives and any configuration of a propulsion device, which may include a propeller, impeller, pod drive, and the like, which may be driven by any motor or engine, such as an outboard motor, an inboard drive, or an inboard/outboard drive (or stern drive), which may be electrically powered or powered by an internal combustion engine, as will be apparent to those of ordinary skill in the art in view of the present disclosure. Additionally, a multitude of various control arrangements for the marine drive(s) on a marine vessel, and for coordination of sensors and auxiliary devices with the function of the marine drive(s), are well known in the art. The embodiments of marine vessels, marine drives, and control arrangements therefor are shown and described herein for purposes of exemplifying the systems and methods disclosed herein, and should not be considered limiting.

The marine vessel 2 is further equipped with several image sensors 28 that sense images of a marine environment on or around the marine vessel 2. A forward image sensor 28a is positioned to capture an image of an area in front of the marine vessel 2, such as positioned on the end of the bow 3 or at some location at the front of the hull of the marine vessel 2 to capture images of the water surface 11 in front of the marine vessel 2. Two rear image sensors 28b and 28c are provided to capture images of an area behind the marine vessel 2, such as arranged as a stereovision system arrangement 50. In the depicted embodiment, the rear image sensor 28b is mounted on the marine drive 8a, and the rear image sensor 28c is positioned on the marine drive 8b. For example, the rear image sensors 28b, 28c may be mounted on the housing of the marine drives 8a, 8b, such as on a top or rear portion of the housing. In other embodiments one or more rear image sensors 28b, 28c may be mounted on the stern 6 of the marine vessel, mounted on a console hardtop or flybridge, or otherwise positioned to capture all or a portion of the water surface in the area behind the marine vessel 2.

Each image sensor 28a-28c may be equipped to sense and image the marine environment on and/or around the marine vessel 2 by any means, which may be visual light cameras, radar, lidar, etc. Each image sensor 28a-28c has a field of view 42a-42c, respectively, which is the area captured, or imaged, by the respective image sensor 28a-28c.

Each image sensor 28a-28c is connected to a computer 80a-80c equipped to process the images from the respective image sensors 28a-28c. In the exemplary embodiment, the images from each of the image sensors 28a-28c are transferred to a designated computer 80a-80c by an image bus 26, which is a data connection between the respective image sensor 28a-28c and its associated computer 80a-80c. In various embodiments, each image sensor 28a-28c may have its own dedicated computing system. Such an arrangement is exemplified in the embodiment of FIG. 1, where the forward image sensor 28a is provided with image computer 80a to process the images therefrom. In other embodiments, two or more image sensors may be associated with a single computer. This arrangement is also exemplified in the context of FIG. 1, where each of the rear image sensors 28b and

28c is connected to a single image computer 80c, which processes the images captured by both sensors. In other embodiments, each rear image sensor 28b and 28c may be provided with its own image computer. A multitude of other arrangements between image sensors 28 and computers 80 is possible. For example, an embodiment is contemplated where a single image computer 80 is provided for all image sensors 28 (e.g., 28a-28c) on the marine vessel 2, and thus processes all of the images captured therefrom. Output from the image computer is provided on the CAN bus 25 so that it may be received by various devices within the system 45, including the powertrain computers 22a, 22b and main processing unit 20. In still another embodiment, the image processing function for one or more of the image sensors 28a-28c may occur on or be integrated into the main processing unit 20. Each of the image sensors 28a-c with their respective image computer 80a-c constitute an image system 60, including the stereovision system 50 as a subsystem therein.

Figure 2:
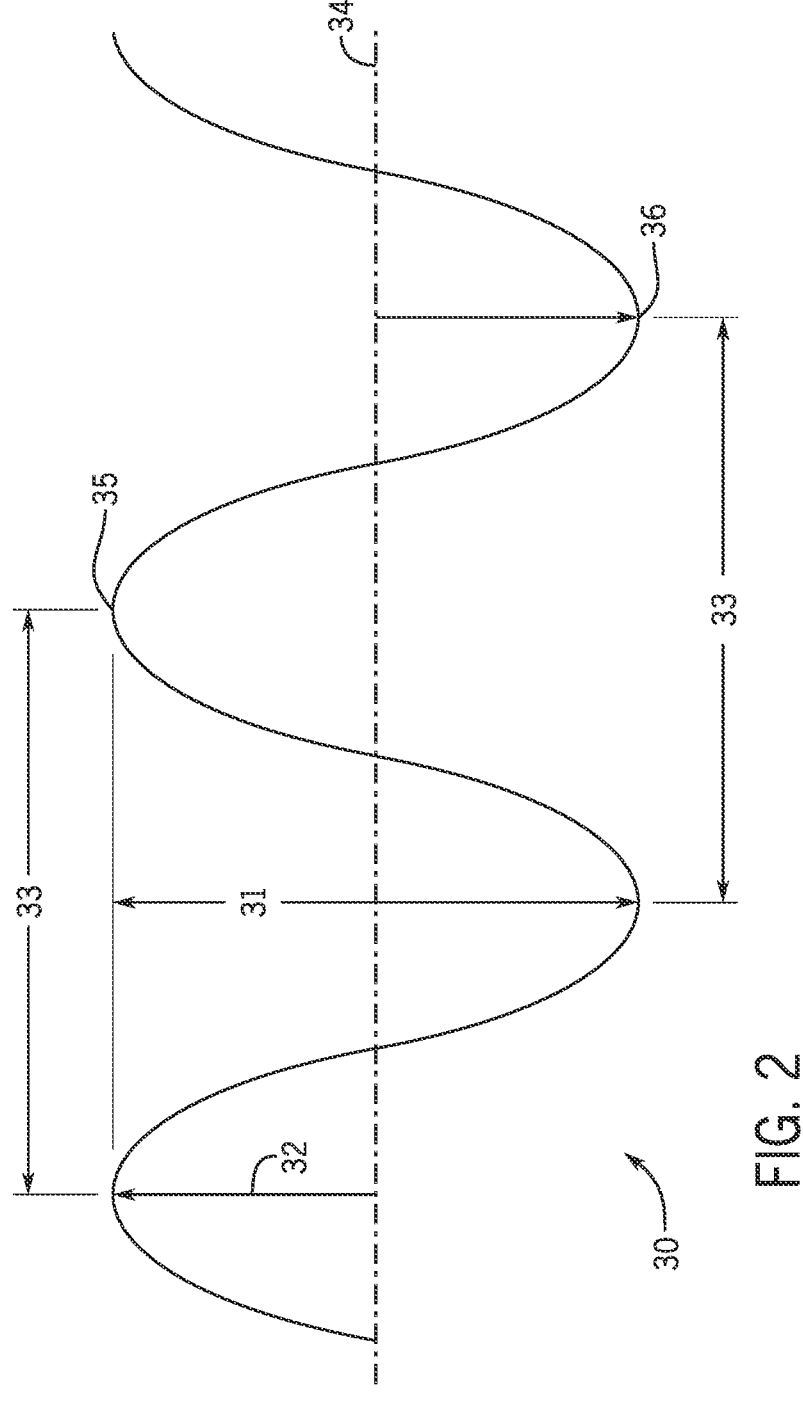
FIG. 2 is a diagram exemplifying a wave.

FIG. 2 depicts a generic waveform for the purposes of identifying wave components as they will be referenced throughout this disclosure. Wave 30 has an amplitude 32, which is the displacement of a wave 30 from an equilibrium 34. Wave height 31 is the distance ranging from a wave crest 35 to its trough 36, also known as twice the displacement of the amplitude 32 of a wave 30. The distance from crest 35 to adjacent crest 35, or trough 36 to adjacent trough 36, is known as the wavelength 33. Another characteristic of a wave 30 is its frequency. A wave frequency is the quotient of the wave speed and wavelength 33. A wake pattern is what is known as a Kelvin wave pattern and is depicted in FIG. 3.

Figure 3:
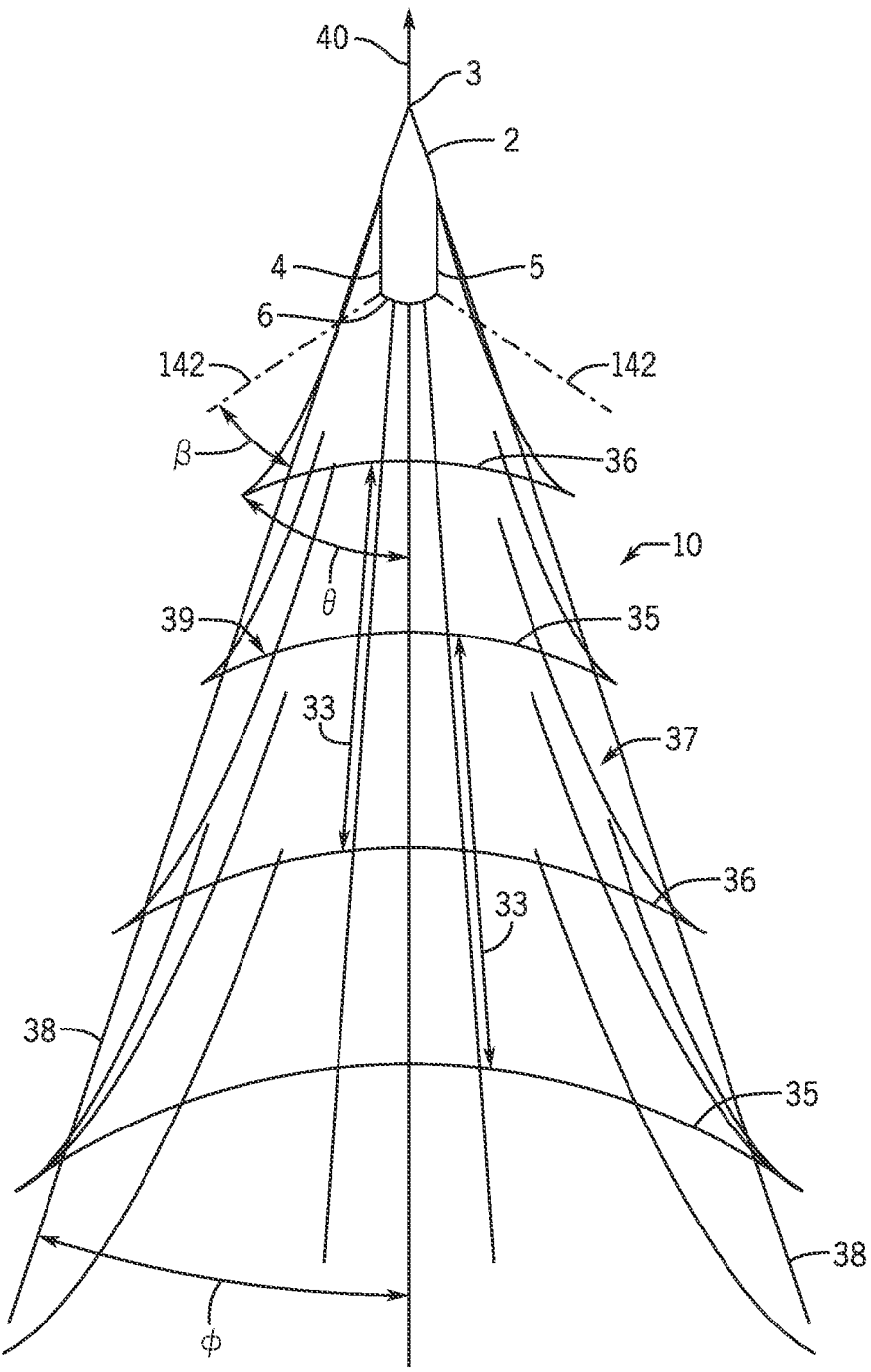
FIG. 3 is a perspective view of a marine vessel generating a wake wave pattern.

FIG. 3 shows marine vessel 2 traveling in direction 40 through the water surface 11. An ideal Kelvin wave pattern is produced by a point source traveling through a perfectly flat surface of fluid. In a realistic environment, various factors will affect the wake pattern production discussed herein, such as turbulence, towed objects or individuals, hull size, vessel weight, direction of travel relative to natural waves, etc. While there will rarely be a perfectly flat water surface to travel upon, nor a vessel that is a perfect point source, the idealized Kelvin wave pattern shown in FIG. 3 provides a useful representation of a vessel-produced wake pattern 10.

A Kelvin wave pattern, hereby referred to as a wake pattern 10, is produced opposite the direction of travel 40 at the stern-side 6 of the marine vessel 2. A wake pattern 10 is produced on a water surface 11 by an object such as a marine vessel 2, traveling through a body of water. The marine vessel 2 produces a wake pattern 10, with transverse waves 39 and divergent waves 37 constructively interfering to produce two wake lines 38, called a Kelvin Envelope, in a chevron extending outward from the stern 6 of the marine vessel 2. The divergent waves 37 emanate outward from the wake lines 38 and the transverse waves 39 travel between the wake lines 38 and opposite the direction of travel 40.

Each wake line 38 has an angular displacement $\Phi$ of approximately 19.5° from the direction of travel 40, with the marine vessel 2 at the vertex. Within the area delimited by the two wake lines 38, curved transverse wave patterns 39 are produced, traveling opposite the direction of travel 40. These transverse waves 39 have alternating crests 35 and troughs 36. The wavelength 33 extends from crest 35 to adjacent crest 35, or trough 36 to adjacent trough 36. Divergent waves 37 emanate outward from the wake lines 38, with an angular displacement $\Theta$ of approximately 53° from the direction of travel 40. The angular displacements $\Phi$ and Θ are generally independent of vessel speed or mass, and are a result of a phenomenon of fluid dynamics, as is understood in the relevant art.

Stereovision system 50 comprises image sensors 28b, 28c each having field of view 42b, 42c, and wherein the fields of view 42b and 42c overlap in at least a portion of the area behind the vessel 2 where wake is being detected. In the exemplary embodiment, each image sensor 28b, 28c is a stereovision camera, enabling the image computer 80c to use depth disparity mapping to analyze the geometries of the waves 30 emanating from the vessel 2. Depth disparity mapping requires image data to be captured from at least two separate image sensors 28b, 28c. For this reason, it is essential that the fields of view 42b and 42c overlap in the portion of the area behind the vessel 2 where wake is being detected. This stereovision field of view 142 extending from the stereovision system 50 is represented in FIG. 3 by the dashed lines. The field of view 142 extends outside of the wake lines 38 by an angular displacement 3. This allows the stereovision system's field of view 142 to capture imagery of at least the transverse waves 39.

Figure 4:
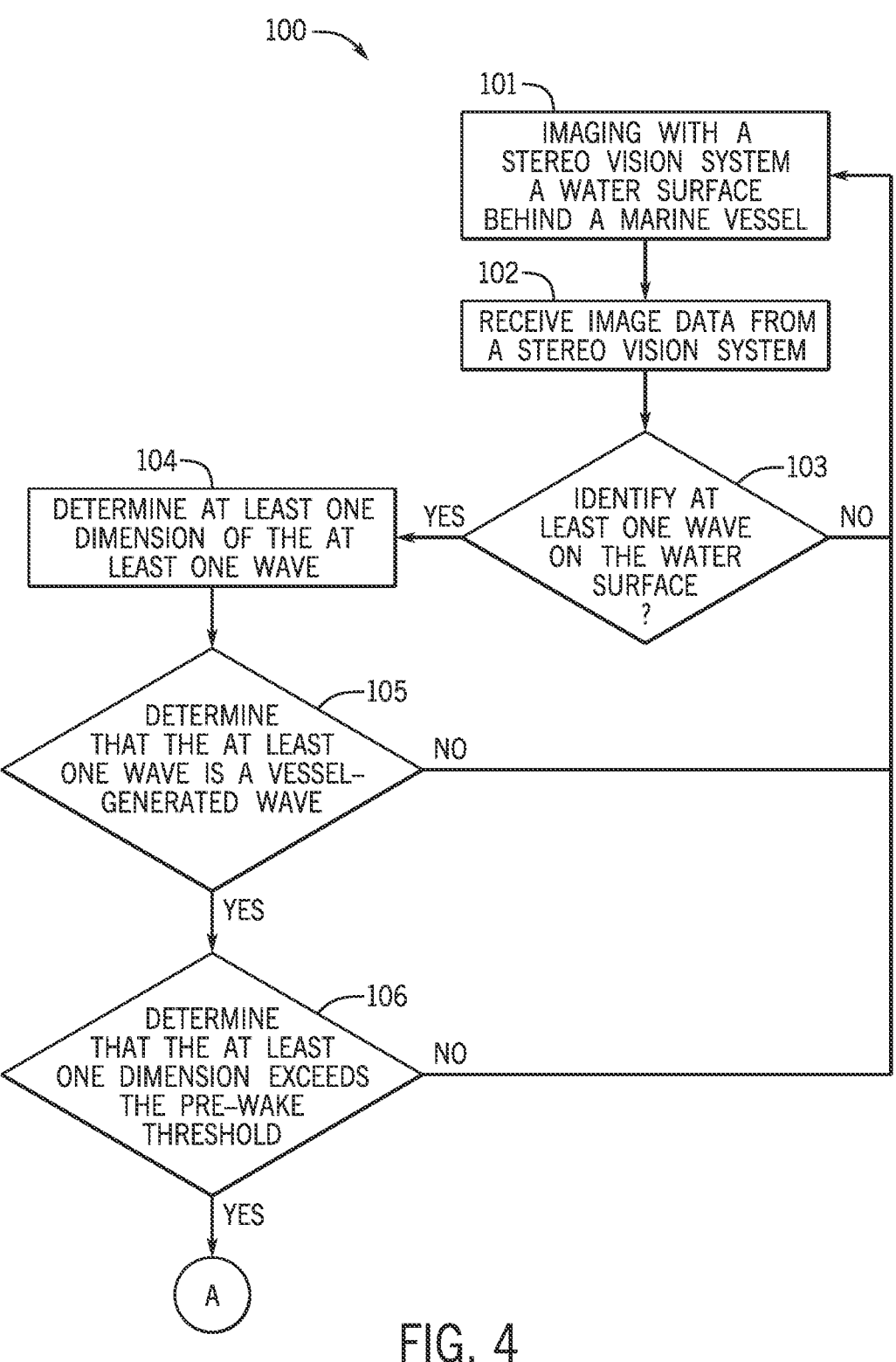
FIGS. 4-5 are a flow charts depicting exemplary embodiments of a method of detecting a wake.

FIG. 4 depicts one embodiment of a method 100 of identifying a wake. At step 101, a water surface 11 behind a marine vessel 2 is imaged by a stereovision system 50 comprising at least two image sensors 28b, 28c positioned at the stern 6 of the marine vessel 2. The image sensors 28b, 28c have fields of view 42b, 42c directed away from the forward direction of travel 40 of the marine vessel 2 so as to capture the water surface 11 behind the marine vessel. Each field of view 42b, 42c extends outside of the wake lines 38 produced in the wake pattern 10, as described in regards to FIG. 3. The image sensors 28b, 28c are positioned and configured on the marine vessel 2 such that the fields of view 42b, 42c encapsulate an area behind the marine drives 8a, 8b extending away from the stern 6 to capture the entire wake pattern 10 produced by the vessel 2. The angles and size of the fields of view 42b, 42c can be impacted by a variety of factors including image sensor placement, lens size, sensor type, etc. It is preferable that the sensors 28b, 28c are placed in a position so that substantially all the wake pattern 10 can be captured within the image data.

The image data is received from the stereovision system 50 and processed via at least one image computer 80c at step 102. The system 45 then determines if at least one wave 30 is identified on the water surface 11 at step 103. If the system 45 does not identify at least one wave 30, the method loops back to step 101. If at least one wave 30 is identified on the water surface 11, the method proceeds to step 104, and at least one dimension of the at least one wave 30 is determined. The at least one dimension can be a wave height 31, a wave amplitude 32, a wavelength 33, a distance-to-shore 41, frequency, persistence, etc. Persistence of a wake is a measurement of a wave's amplitude 32 in relation to a distance traveled, such as the distance from its point of origin over time. The point of origin of the wave can be defined relative to the position of the vessel at the time of producing the wave and/or the position of the image sensors capturing the sensor data of the wave. Alternatively, persistence of a wake can be measured with respect to some other fixed point, such as a shore location or a buoy or some other detectable feature locatable in the sensor data across images.

In some embodiments, at step 105, the system 45 is configured to determine whether the at least one wave is a vessel-generated wave, as opposed to a naturally occurring wave. This can be carried out, for example, using computer vision machine learning, which can utilize previously stored image data to recognize wave patterns indicative of a vessel-generated wave 30. Alternatively, the system 45 may be configured to determine whether the wave is a vessel-generated wave based on its location, shape, and/or direction of travel. For example, the system 45 may be configured to classify a wave as a vessel-generated wave only if it is traveling at an angle that is less than or equal to Θ from the direction of travel 40, as is depicted in FIG. 3. If a wave is imaged that is traveling at 90 degrees with respect to the direction of travel 40, then the system 45 determines that the wave is not a wake wave, such as a naturally occurring or externally produced wave, and the method loops back to step 101.

At step 106, it is determined whether the measured dimension of the at least one wave 30 exceeds a pre-wake threshold. This may include exceeding a wave dimension pre-wake threshold. Alternatively or additionally, this may include detecting the presence of a threshold wave feature, such as the presence a white cap. If the measured dimension or features does not exceed the pre-wake threshold, the method loops back to step 101. If the measured dimension or feature does exceed the pre-wake threshold, then action is taken to mitigate and/or eliminate the wake. For example, the system may execute differing actions based on whether the at least one wave 30 is identified as a wake wave or is a pre-wake condition. In alternative embodiments, upon determining that the measured dimension or features do not exceed the pre-wake threshold, the system may be configured to generate a notification indicating that the user is not at risk of producing a wake or that the user may increase the speed of the vessel without producing a wake before looping back to step 101.

A pre-wake threshold is defined by a dimension or feature of a wave that, if met, is indicative of at least a pre-wake condition—e.g., a wave aspect and/or wave behavior indicating that a wake is likely to occur if the current conditions (e.g., vessel speed, heading, and/or surrounding water conditions) are maintained or increased. A pre-wake condition is the state of wave just prior to it qualifying as a wake, wherein a user is not actively producing a wake, but is close to doing so under current conditions and is likely to produce waves that qualify as a wake if the current conditions change (e.g., vessel speed increases, vessel gets closer to the shore line, etc.). For example, if the system detects that the amplitude 32 of a wave 30 is greater than that of a pre-wake threshold, the user is at high risk of actively producing a wake wave or perhaps is already doing so.

The pre-wake threshold may include, for example, any one or more of wave height, wave amplitude, wave frequency, wave shape, the presence of a white cap on the wave, wave persistence, and/or travel direction and location with respect to the marine vessel. In certain embodiments, the system may be configured to recognize movement of neighboring vessels caused by waves produced by the vessel. For example, the system may be configured to recognize threshold displacements of neighboring vessels in a vertical direction as being indicative of a pre-wake condition, such as by training a computer vision machine learning algorithm to detect such displacements across recorded images. If the pre-wake threshold defines a maximum value above which a pre-wake condition is detected, such as a threshold wave height or a threshold persistence, and the measured dimension is greatly exceeded, then a wake is likely already occurring. The system 45 may utilize multiple dimensions or features of a wake to define multiple pre-wake thresholds to be used either independently or in conjunction with one another. In some embodiments, the system may be configured to define a pre-wake threshold as a ratio between two dimensions of a wave. For example, system 45 may be configured to define a pre-wake threshold as the ratio of wave amplitude to wavelength.

Figure 5:
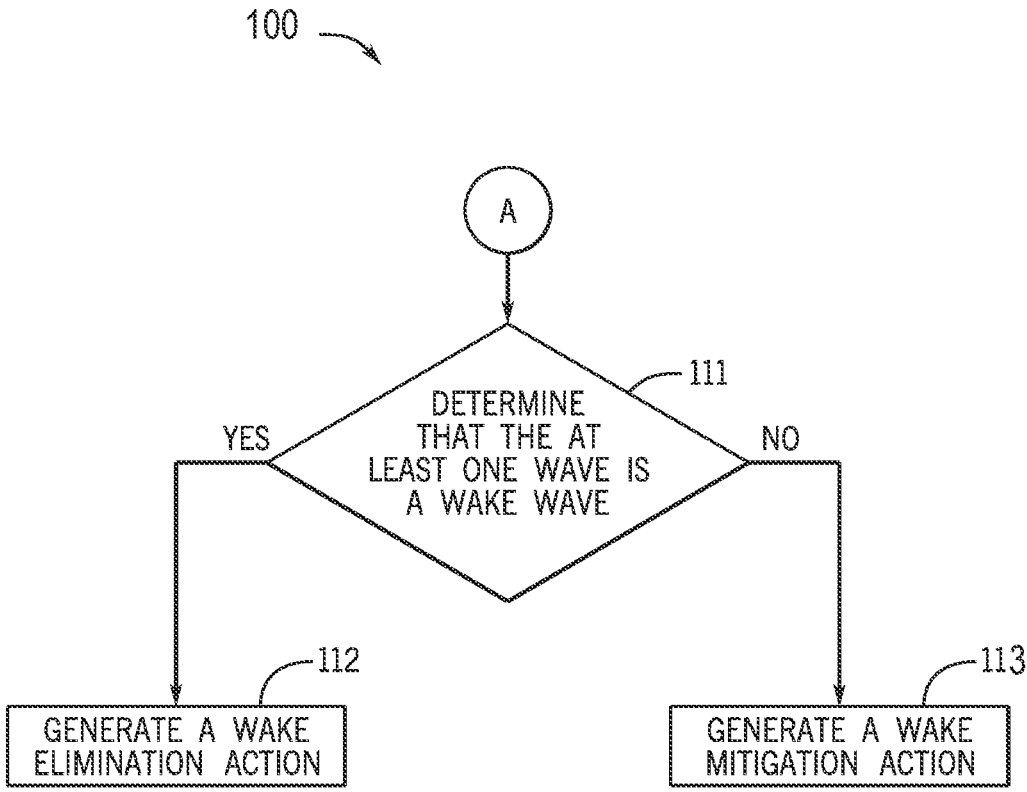

FIG. 5 represents the designation of one of two actions that the system may execute based on whether the at least one wave 30 is identified as a wake wave. A wake wave is a wave 30 which has a dimension or feature exceeding a wake threshold. The wake threshold may be defined based on the same dimensions as the pre-wake threshold or may be different. For example, both the pre-wake threshold and the wake threshold may include wave amplitude and/or wave frequency values. For example, the wake threshold may include a wave amplitude value that is greater than the pre-wake threshold wave amplitude. Alternatively, they may include different dimensions. For example, the threshold wake detection may include assessment of whether the wave has a whitewater cap and the pre-wake threshold may not include such a consideration.

The value types included and/or the magnitudes of each value for each of the pre-wake threshold and the wake threshold can vary according to different local restrictions or definitions of wake and is set to represent an approximation of a dimension that classifies a wake. The thresholds can be a set value input by system administrators, could be set or adjustable based on location (e.g., GPS location) to comply with local rules, or optionally may be adjustable by the user to comply with the specific restrictions of the body of water they are operating within.

In the exemplary embodiment, at step 111, if the at least one dimension is determined to not meet, e.g., be less than, the wake threshold and is not identified as a wake wave, then a wake mitigation action is generated at step 113. A mitigation action is an action configured to contain or reduce the likelihood of a wake occurring, such as generating an alert via a user interface advising of the pre-wake condition and/or instructing a specific action, such as maintaining a specified vessel speed, a reduction in vessel speed, a trim change, etc. For example, a wake mitigation action may include generating an alert on a user interface such as a speaker 18 or a display screen 19 indicating that the user is at risk of or actively producing a wake. In alternative embodiments, the wake mitigation action at step 113 can be a notification via a user interface that the vessel is within a no wake zone. Alternatively or additionally, the wake mitigation action may include automatic control of the propulsion system to prevent the vessel speed from increasing and/or to reduce the vessel speed, change the trim position, etc. Other examples of wake mitigation actions may include automatically controlling the propulsion system 90 to slow the speed of the vessel by a threshold amount or to a threshold vessel speed, automatically adjusting trim tabs or wake shaping mechanisms, any auditory, visual, or haptic signals instructing the user to effectuate such actions.

If the at least one dimension is determined to meet the wake threshold at step 111, it is determined to be a wake wave and a wake elimination action is generated at step 112. Some examples of a wake elimination action include generating an alert on a user interface such as the speaker 18 or display screen 19 indicating that the user is actively producing a wake and/or instructing the user to take action to eliminate the wake, such as to reduce the vessel speed or change the trim. Other examples of wake elimination actions that may be taken at step 112 include automatically controlling the propulsion device to reduce the vessel speed (such as by a threshold amount or to a threshold vessel speed), adjusting trim tabs or wake shaping mechanisms or any auditory, visual, or haptic signals instructing the user to effectuate such actions.

For instance, the wake elimination action represented at step 112 may include automatically controlling the propulsion system 90 to reduce the vessel speed or the drive RPM (e.g., engine RPM or motor RPM) to a minimum steerage maintenance speed. The minimum steerage maintenance speed is defined as the minimum speed that the vessel 2 can travel whilst maintaining steering control of the vessel 2. The definition of wake is often tied to the minimum steerage speed, as it is often defined as the lowest possible speed that a vessel 2 can travel at while maintaining control of the vessel 2. This value may be predetermined according to vessel type, vessel mass, current weight on the vessel, accessories which alter the control of the vessel 2, etc. In such an embodiment, the predetermined minimum steerage speed may be a set value input by system administrators upon system configuration, or optionally can be adjustable by the user to account for the aforementioned variables which impact wake production and vessel control. In alternative embodiments, the minimum steerage maintenance speed can be dynamically determined according to vessel performance and sea state conditions, such as measured vessel speed, vessel heading over time, buoyancy of the water, frequency of naturally occurring waves, wind speed, currents, etc.

An alternative embodiment of step 111 utilizes computer vision machine learning to identify telltale signs of a wake wave. Prior to or in addition to determining a dimension of the at least one wave, image computers 80 may process image data from image sensors 28 and identify telltale signs of a wake. An example of a telltale sign of a wake is a whitewater cap, but further identifiers can be used according to the computer vision machine learning system. Proceeding to step 112, the system is configured to generate a wake elimination action.

Figure 6:
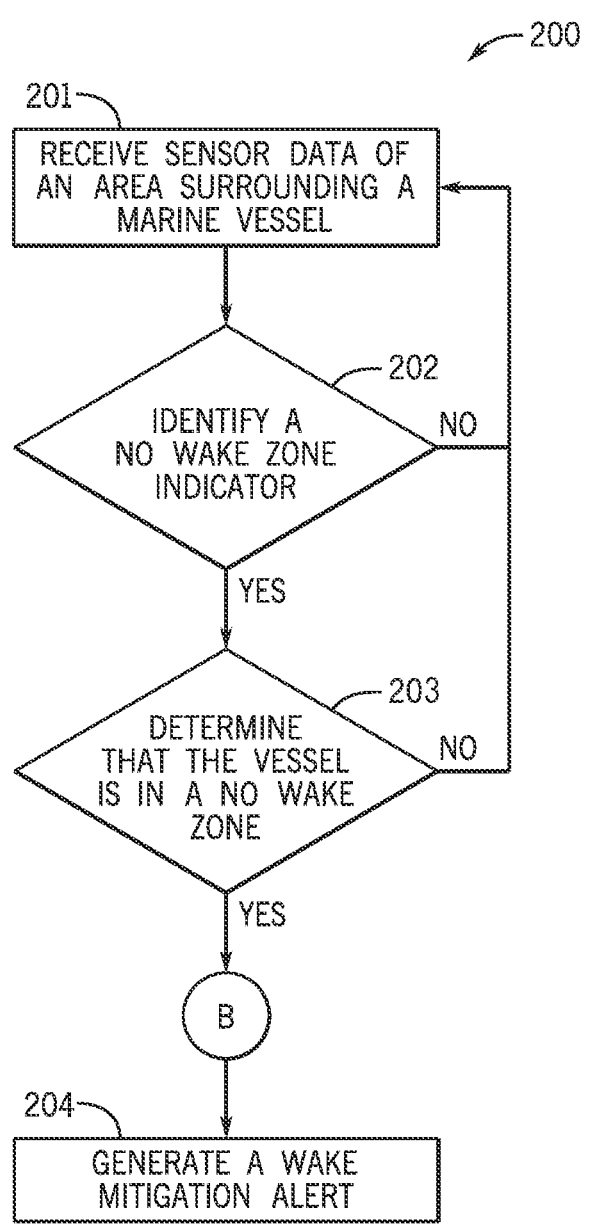
FIGS. 6-7 are flow charts depicting exemplary methods of identifying a no wake zone and detecting a wake in a no wake zone.

FIG. 6 depicts a method 200 of identifying that the vessel 2 is within a no wake zone. A no wake zone is an area on a body of water where marine vessels 2 are not permitted to produce wake waves. A no wake zone can be demarcated by warning buoys, information signs, etc. In some jurisdictions, no wake zones can be implied based upon neighboring vessel traffic or a minimum distance-to-shore. For example, if there are a certain number of vessels in a specific area, particularly moored or anchored vessels, it may be a violation of no wake restrictions to produce a wake within a certain distance of said vessels. No wake zones can also vary based upon the time of day. Entire bodies of water, or sections thereof, may be considered no wake zones at certain times of day.

Image data of a surrounding area of the marine vessel 2 captured by image system 60 is received at step 201 and processed via image computers 80a, 80c. At step 202, it is determined whether the image data captured includes a no wake zone indicator. In certain embodiments, the image data assessed for detection of the no wake zone indicator may be confined to the front-facing camera 28a and/or any cameras imaging the starboard and port side directions off the vessel. In other embodiments, the assessment may include one or more of the rear-facing cameras 28b and 28c. The surrounding area of the marine vessel may be defined as a perimeter extending a predefined distance away from the marine vessel 2. The predefined distance away from the marine vessel can be set by system administrators or can be adjustable based upon the user's preference.

Examples of no wake zone indicators can include imminent shorelines, warning buoys or other no wake signs, or neighboring vessels. In some embodiments, GPS data or other mapping systems can be used to delineate areas classified as no wake zones. For example, the technique known as geo-fencing, or any other technology that utilizes GPS services and location-aware devices, may be used to establish a "fenced-in" area representing the no wake zone according to GPS coordinates. Upon entry into a geo-fenced area, the location-aware device can be configured to carry out a variety of tasks. For the purposes of this disclosure, entry into a geo-fenced no wake zone and/or a warning area encompassing the no wake zone could serve as a no wake indicator, thus indicating to system 45 that the vessel 2 was operating within a no wake zone. Geo-fencing could be used to establish areas encapsulating only no-wake zones, such that entry into the geo-fence indicates entry into a no wake zone. Alternatively or additionally, geo-fencing could be used to indicate that marine vessel 2 is approaching a no wake zone, such that a wake mitigation action can be generated upon detecting a predefined proximity to a no wake zone.

If the system 45 does not identify a no wake zone indicator within the surrounding area, the method loops back to step 201. If a no wake zone indicator is identified in the surrounding area, it is then determined whether the vessel 2 is operating within the no wake zone at step 203. If the vessel 2 is not determined to be within or approaching a no wake zone, the method loops back to step 201. If the vessel 2 is identified as operating within a no wake zone, a wake mitigation alert is generated at step 204. In some embodiments, the system may also be configured to generate a wake mitigation alert when it is determined that the marine vessel 2 is within a threshold distance of the wake zone and is headed toward it. In certain embodiments, the threshold distance of the wake zone may be speed-dependent, where the threshold distance is greater at larger vessel speeds so as to provide sufficient time to slow the vessel 2 before it enters the no wake zone. A wake mitigation alert can be a notification via a user interface that the vessel 2 is within or approaching a no wake zone. Other examples of a wake mitigation alerts can be any auditory, visual, or haptic signal indicating to the user to slow the speed of the vessel 2.

Figure 7:
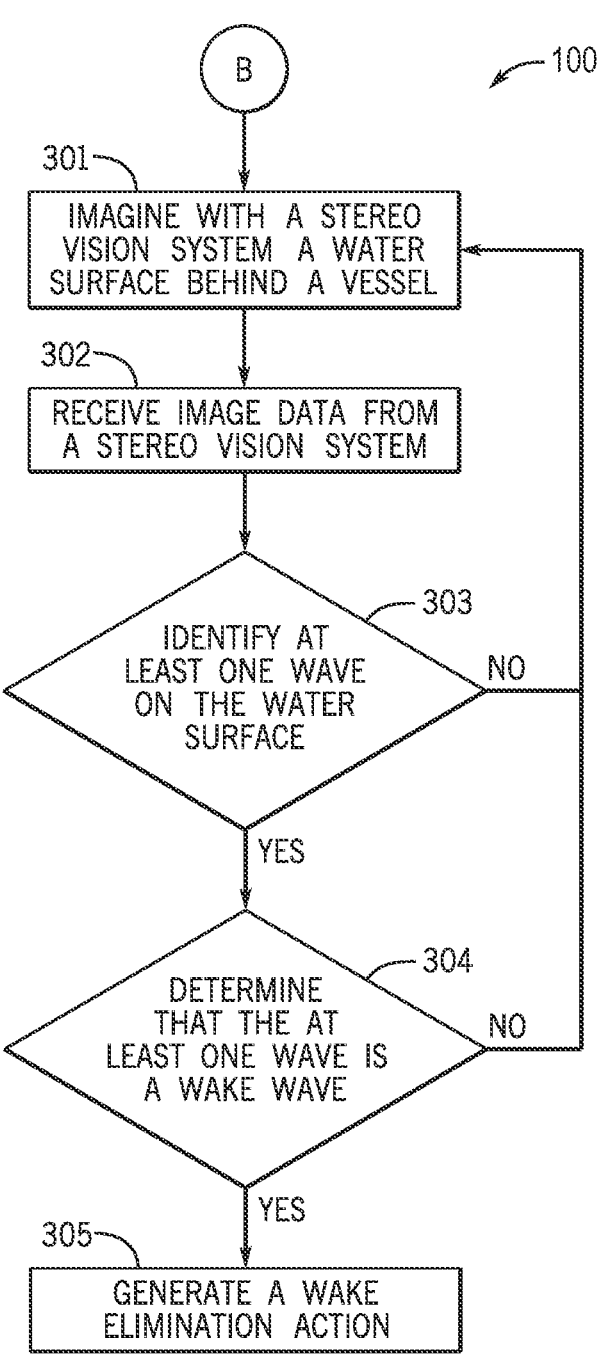

Alternatively or additionally, the control system 45 may be configured to automatically activate an embodiment of the wake detection method 100, depicted in FIG. 7, once it is determined that the marine vessel is in a no wake zone. Image data of a surrounding area of the marine vessel 2 is received at step 201 and processed via an image computer 80. At step 202, itis determined whether the image data captured includes a no wake zone indicator. If the system does not identify a no wake zone indicator within the image data, the method loops back to step 201. If a no wake zone indicator is identified in the image data, it is then determined whether the vessel 2 is operating within the no wake zone at step 203. If the vessel 2 is not operating within the no wake zone, the method loops back to step 201. If the vessel is identified as operating within the no wake zone, the method activates the wake detection method 100. At step 301, a water surface behind the marine vessel 2 is imaged using a stereovision system 50. The image data is received from image sensors 28b, 28c and processed via image computer 80c at step 302. At step 303, it is determined whether the image data captured identified at least one wave 30 on the water surface 11. If the system does not identify at least one wave 30, the method loops back to step 301. If the system does identify at least one wave 30, the system determines whether the at least one wave 30 is a wake wave at step 304. Methods of determining whether the at least one wave 30 is a wake wave are described above. If the at least one wave 30 is not identified as a wake wave, the method loops back to step 301. If the at least one wave 30 is identified as a wake wave, a wake elimination action is generated at step 305 and the method 200 proceeds to step 204 to generate a wake mitigation alert.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

I claim:

1. A wake detection system on a marine vessel comprising:
   a stereo vision system on the marine vessel including at least two cameras, the stereo vision system configured to image a water surface behind the marine vessel where wake lines extend outward from a stern of the marine vessel to generate stereovision image data;
   a control system configured to:
   receive the stereovision image data from the stereo vision system;
   identify at least one wave on the water surface in the stereovision image data;
   identify that the at least one wave includes at least one vessel-generated wave generated by the marine vessel based on a location of the at least one wave in the stereovision image data being between the wake lines;
   determine at least one dimension of the at least one vessel-generated wave based on the stereovision image data; and
   determine that the at least one dimension exceeds a pre-wake threshold and then generate a wake mitigation action.

2. The wake detection system of claim 1, wherein the wake mitigation action includes an alert generated on a user interface.

3. The wake detection system of claim 1, wherein the wake mitigation action includes controlling a propulsion system of the marine vessel to prevent a speed increase or reduce a speed of the marine vessel.

4. The wake detection system of claim 1, wherein the at least one dimension is a height of the at least one vessel-generated wave and the pre-wake threshold includes a wave height threshold or wherein the at least one dimension is an amplitude of the at least one vessel-generated wave and the pre-wake threshold includes wave amplitude.

5. The wake detection system of claim 4, wherein the pre-wake threshold further includes persistence.

6. The wake detection system of claim 1, wherein the control system is further configured to determine that the at least one wave is the vessel-generated wave generated by the marine vessel based further on an angle of a direction of travel of the wave with respect to the marine vessel or an angle of a shape of the wave with respect to the marine vessel.

7. The wake detection system of claim 1, wherein the control system is further configured to detect a wake behind the marine vessel based on the stereovision image data.

8. The wake detection system of claim 7, wherein the control system is configured to detect the wake based on detection of whitewater on the at least one vessel-generated wave.

9. The wake detection system of claim 7, wherein the control system is configured to detect the wake based on the at least one dimension of the at least one vessel-generated wave.

10. The wake detection system of claim 7, further comprising generating a wake elimination action in response to detection of the wake, wherein the wake elimination action includes an alert generated on a user interface.

11. The wake detection system of claim 7, further comprising generating a wake elimination action in response to detection of the wake, wherein the wake elimination action includes controlling a speed of the marine vessel to eliminate the wake.

12. The wake detection system of claim 11, wherein the wake elimination action of controlling the speed of the marine vessel includes reducing the speed of the marine vessel to a minimum steerage maintenance speed.

13. The wake detection system of claim 1, wherein the control system is further configured to determine that the marine vessel is in a no wake zone prior to generating the wake mitigation action.

14. The wake detection system of claim 13, wherein the control system is further configured to determine that the marine vessel is in the no wake zone based on a GPS location of the marine vessel.

15. The wake detection system of claim 13, wherein the control system is further configured to detect a no wake indicator in the stereovision image data and to determine that the marine vessel is in the no wake zone based thereon.

16. The wake detection system of claim 13, wherein the control system is further configured to determine that the marine vessel is in the no wake zone based on a user-input.

17. A method of detecting wake behind a marine vessel, the method comprising:

imaging with an image system on the marine vessel a water surface behind the marine vessel where wake lines extend outward from a stern of the marine vessel;

receiving image data from the image system, the image data containing at least one image of the water surface behind the marine vessel;

identifying at least one wave on the water surface in the at least one image;

identifying that the at least one wave includes at least one vessel-generated wave generated by the marine vessel based on a location of the at least one wave in the image data being between the wake lines;

determining at least one dimension of the at least one vessel-generated wave based on the image data; and determining that the at least one dimension exceeds a pre-wake threshold and then generating a wake mitigation action, wherein generating the wake mitigation action comprises controlling a propulsion system of the marine vessel.

18. The method of claim 17, wherein the wake mitigation action includes an alert generated on a user interface.

19. The method of claim 17, wherein generating the wake mitigation action includes controlling the propulsion system of the marine vessel to prevent a speed increase or reduce a speed of the marine vessel.

20. The method of claim 17, further comprising determining that the at least one wave is the vessel-generated wave generated by the marine vessel based further on an angle of a direction of travel of the wave with respect to the marine vessel or an angle of a shape of the wave with respect to the marine vessel.

21. The method of claim 17, further comprising:

detecting a wake behind the marine vessel based on the image data and then generating a wake elimination action.

22. The method of claim 21, wherein generating the wake elimination action comprises generating an alert on a user interface.

23. The method of claim 17, wherein controlling the propulsion system comprises controlling a speed of the marine vessel.

24. The method of claim 23, wherein controlling the speed of the marine vessel comprises reducing the speed of the marine vessel to a minimum steerage maintenance speed.

* * * * *